United States Patent [19]

Papalexis

[11] 4,273,496
[45] Jun. 16, 1981

[54] DEVICE FOR DEPANNING FRESHLY BAKED PIZZA OR OTHER BAKED GOODS

[76] Inventor: Gregory C. Papalexis, Cambridge Way, Alpine, N.J. 07620

[21] Appl. No.: 60,640

[22] Filed: Jul. 25, 1979

[51] Int. Cl.$^3$ ............................................. B65G 59/00
[52] U.S. Cl. .................................... 414/417; 198/484; 198/705
[58] Field of Search ................. 198/484, 705; 414/417

[56] References Cited

U.S. PATENT DOCUMENTS

| 2,874,650 | 2/1959 | Royer | 198/796 |
|---|---|---|---|
| 2,949,995 | 8/1960 | Welch | 198/484 |
| 3,108,679 | 10/1963 | Woody | 198/484 |
| 3,456,811 | 7/1969 | Mahoney et al. | 414/417 |
| 3,458,072 | 7/1969 | Romeo | 414/417 |
| 3,776,405 | 12/1973 | Gade | 414/417 |

Primary Examiner—Lawrence J. Oresky
Attorney, Agent, or Firm—Constantine A. Michalos; Peter C. Michalos

[57] ABSTRACT

A device for depanning freshly baked goods, and in particular pizza, soon after they leave an oven comprising, a pan conveyor adapted to extend from the oven with at least one baking pan disposed thereon, with the conveyor then moveable in a feed path from the oven. The baking pan has a plurality of perforations therethrough. A pin-block conveyor is associated with the pan conveyor and includes at least one pin-block connected thereto and moveable substantially parallel to the feed path of the baking pan. A plurality of pins extend from the pin-block and are arranged in a pattern and number equal to that of the perforations in the baking pan. Each pin has a diameter which is at most smaller than the diameter of each perforation so that each pin can extend through each corresponding perforation. Guide rails and stopping arms are associated with the pin conveyor for centering the baking pan on the pan conveyor and momentarily stopping it to effect a registration and alignment between the perforations therethrough and the pins on the pin-block. Hold down rails are provided to hold the baking pan down on the pan conveyor. A pin raising device is associated with the pin block for raising the pins after they have come into alignment with the perforations to extend the pins through the perforations at a location spaced from the oven. The baking pan is adapted to contain a baked good which is raised and separated from the pan when the pin raising device operates to extend the pins through the perforations.

11 Claims, 3 Drawing Figures

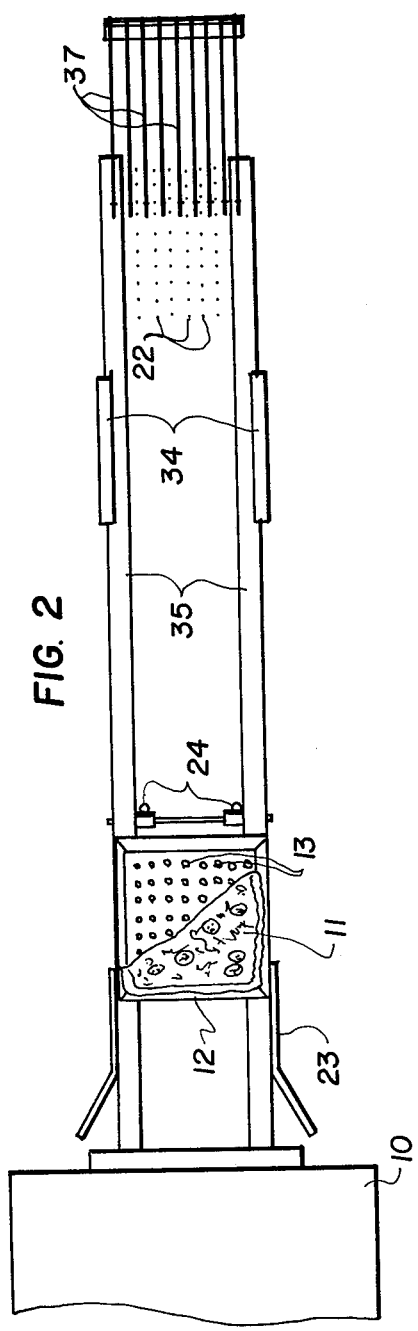
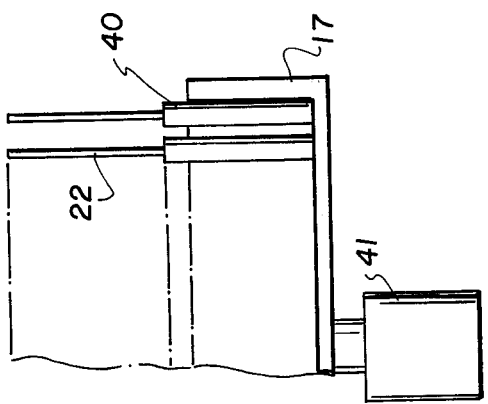

DEVICE FOR DEPANNING FRESHLY BAKED PIZZA OR OTHER BAKED GOODS

BACKGROUND OF THE INVENTION

1. Field of the Invention

The present invention relates in general to depanning devices for removing a baked good from a baking pan and, in particular, to a new and useful device for depanning freshly baked goods, particularly pizza, from the baking pans soon after they leave an oven in which they were baked.

2. Description of the Prior Art

It is known to lift baked goods from a baking pan using various vacuum devices or mechanical shakers. Such devices are particularly adapted for removing baked goods such as bread or rolls from pans since they are unlikely to be damaged by the depanning device. A problem arises when more fragile baked goods such as pizza and pastries are involved. In such cases, the depanning operation is even more critical since, after a passage of time, the baked goods often soften and become more difficult to handle. This softening also contributes to the sticking of the baked good to the baking pan and thereby increases the difficulty in removing the same, therefrom.

SUMMARY OF THE INVENTION

It is an object of the present invention to overcome the prior art difficulties in removing baked goods from a baking pan, and particularly for removing such fragile baked goods as pizza in a way which minimizes or eliminates any possible damage to the baked good.

The invention takes advantage of the fact that baked goods, including pizzas, usually have a crust or outer covering which is quite hard when it first leaves an oven and then softens after a certain time which is characteristic of the particular baked good involved. In the making of pizzas for example, the crust of a pizza often stays hard for approximately one minute after it leaves an oven, then begins to soften. As the pizza softens it becomes more likely to stick to the baking pan in which it was baked.

The invention provides a perforated baking pan in which the pizza can be baked and in which it can be carried from an oven. A conveyor carries the perforated baking pan from the oven and moves it in a feed path. A second conveyor is spaced from the pan conveyor and moves substantially parallel to the feed path of the baking pans. A plurality of pin-blocks are connected to the second conveyor and registery means are provided for centering the baking pan on its pan conveyor so as to correspond with the position of each pin-block and for momentarily holding the baking pan so that a pin-block can come into alignment beneath it. Each pin-block is provided with a plurality of pins which extend upwardly toward the pan and which are in a pattern and number corresponding to that of the perforations in the baking pan. A pin moving means is disposed at some point, spaced from the oven or associated directly with the pins, for lifting the pins and forcing them to extend through the perforations at a predetermined position and time after the baking pans leave the oven. The extension of the pins through the perforations cause the baked good within the baking pan to be lifted and separated from the baking pan and be suspended on the pins. A final or third conveyor is provided which can be in the form of a comb intermeshed with the rows of pins on the pin block for lifting and removing the baked good from the pin block and finally conveying it to an ultimate destination such as a freezer. The means for activating the pins may either be in the form of a cam positioned at some point in the path of the second conveyor to lift the entire block with its pins, or be in the form of separate hydraulic cylinders connected to each pin for lifting each pin separately. Other possibilities are to hydraulically lift the entire pin-block as a whole or provide other mechanical means for lifting the pins.

According to another feature of the invention, the hold down means which are provided for holding the baking pans down on the baking pan conveyor may be in the form of a magnetic rail which is disposed beneath the pans and on either side thereof, for magnetically attracting the pans and holding them down. In a preferred embodiment, the pans are positioned approximately 1/64th of an inch from the magnetic rails so they are not in actual contact, which contact would increase wear on the pans and the magnetic rails. Alternatively, elongated guides may be provided over the pans to physically hold them down. These hold down devices are particularly necessary to maintain the pan in its bottom position when the pins are extended upwardly through the perforations to lift the baked goods off the pans.

Accordingly an object of the present invention is to provide a device for depanning freshly baked goods, and in particular pizza, soon after they leave an oven comprising: a pan conveyor adapted to extend from the oven, at least one baking pan having a plurality of perforations therethrough disposed on said pan conveyor and moveable thereby in a feed path from the oven, and adapted to carry a baked good from the oven; a pin-block conveyor associated with said pan conveyor; at least one pin-block connected to said pin-block conveyor and moveable thereby into the vicinity of said feed path; a plurality of pins extending from said pin-block in a pattern and number corresponding to that of said perforations on said baking pan and each of a diameter at most smaller than that of each of said perforations; guide means associated with said pan conveyor and pin-block conveyor for guiding said baking pan on said pan conveyor to bring said perforations into registery and alignment with said pins; hold down means associated with said baking pan for holding said baking pan down; pin raising means associated with said pin-block for raising said plurality of pins at a location spaced from the oven after said perforations are brought into registery and alignment with said pins to extend said pins through said perforations thereby lifting the baked good in said pan and separating it therefrom; and means associated with said pin-block for removing the baked good from said pan.

A further object of the present invention is to provide a device for depanning freshly baked goods which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIG. 2 is a top planned view of the embodiment shown in FIG. 1 with a light modification; and FIG. 3 is a side elevational view of an alternate embodiment for the means used to raise the pins on the pin-block.

DESCRIPTION OF THE PREFERRED EMBODIMENTS

Figure 1:
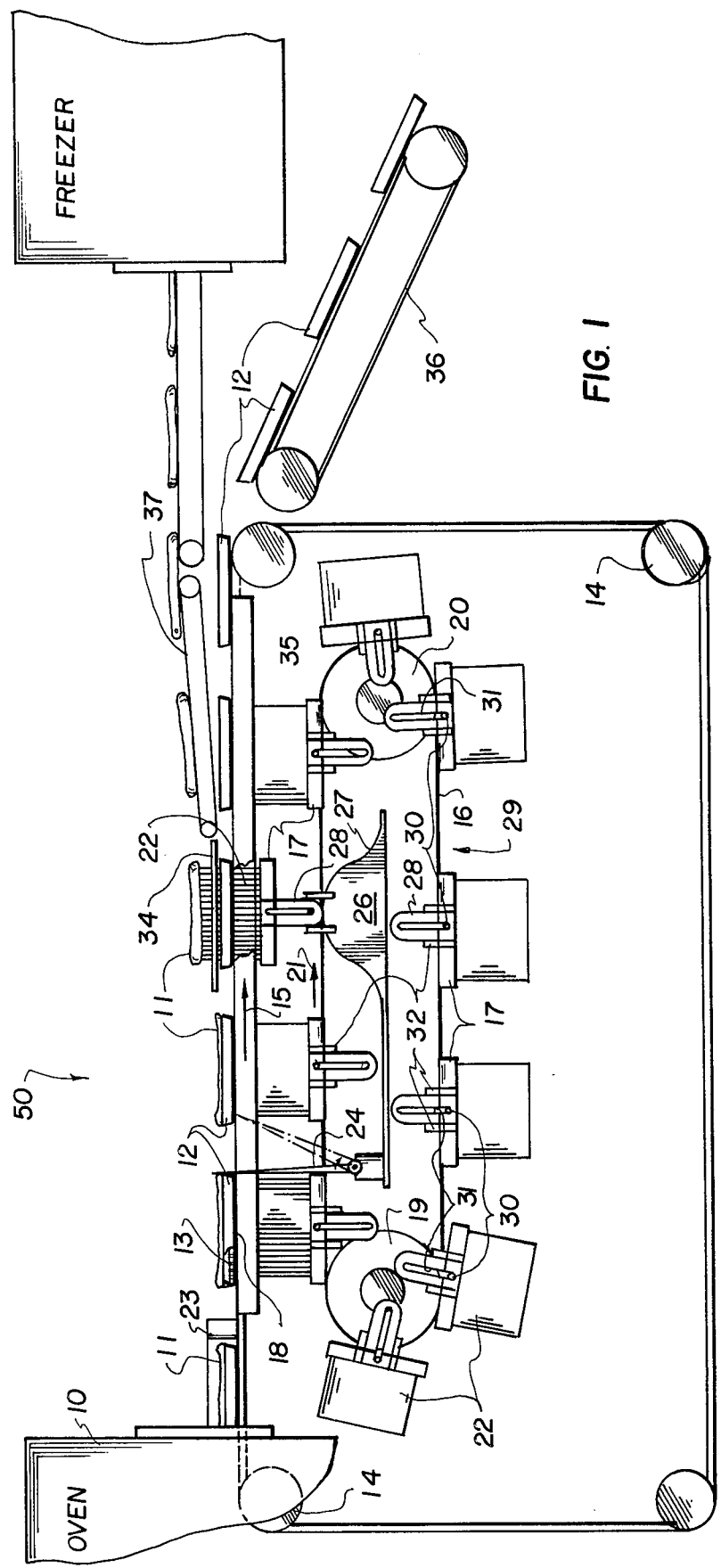
FIG. 1 is a side elevational view of a device constructed in accordance with the invention.

Referred to the drawings in particular, the invention embodied therein, in FIG. 1 comprises, a device for depanning a baked good generally designated 50, soon after the baked good is baked in an oven 10. A baked good for example, a pizza 11, is carried, baked and conveyed in a perforated pan 12. Pan 12 is conveyed on a pan conveyor 14 which may be a belt or chain conveyor or a conveyor of conventional design. Pans 12 are adapted to simply rest on the pan conveyor 14 so that they can be displaced thereon or held momentarily. Conveyor 14 moves the pan 12 in a feed path indicated by arrow 15. Associated with the conveyor 14 is a second conveyor 16 which may be a chain or belt conveyor on to which is connected a plurality of pin-blocks 17. Conveyor 16 may be guided around pulleys or sprockets 19 and 20 and rotated in a direction to move conveyor 16 in the direction indicated by arrow 21, thus moving each pin-block 17 into the vicinity of the feed path indicated by arrow 15. Each pin block 17 includes a plurality of pins 22 which extends outwardly from each pin block 17. Each pan 12 includes a plurality of perforations 13 which extend through the base 18 of the pans 12 and are in a pattern and number corresponding with that of pins 22 on the pin-blocks 17.

Guide means are provided for centering and positioning the pan 12 so that the perforations can be brought into alignment and registery with the plurality of pins 22. With reference to FIG. 2, one example of such guide means include side guides 23 for centering the pans 12 on the conveyor 14 and thus centering the pans 12 with respect to the pin blocks 17. Alignment in the direction of the feed path 15 is achieved, for example, using an indexing rod 24 which is spring loaded and biassed in a direction away from arrows 15 and 21. The indexing rod forms a part of the guide means and can momentarily hold the pans 12 as conveyor 14 continues to move. When a pin block 17 runs into the indexing rod or rods 24, rod 24 is forced to pivot clockwise into its position shown in dot-dash line, through the action of conveyor 16 as it moves in the direction of arrow 21. Since rod 24 only moves when pin block 17 strikes it, the front edge of pan 12 is perfectly aligned with front edge of pin block 17 which are arranged so that the registery of these two front ends corresponds with the registery and alignment of the pins 22 with the perforation 13.

Means are also provided for lifting the pins, separately or with their pin-block 17, upwardly with respect to the pans 12 and thereby forcing the pins 22 to extend through the perforations 13. In accordance with FIG. 1 these means comprise a cam 26 with a cam surface 27 which is associated with the conveyor 16 at a space location from the oven 10. Each pin-block 17 includes a cam follower 28 which rides up onto cam surface 27 thereby forcing pins 22 upwardly and through the perforations 13. Suitable connecting means 29 connected the pin-blocks 17 with the conveyor 16, for example, may be pivot pins 30 connected to the conveyor 16 which ride within slots 31 in each pin-block. The pins 22 are maintained parallel with respect to their direction of movement as they ride up the cam surface 27 by suitable guides 32 which are connected to the conveyor 16 on either side of cam follower 28.

Hold down means are necessary to maintain the pan 12 in a downward position as the pins 22 are raised by the pin raising means to lift the pizza or other baked good 11 from the pan 12. These means may take the form of top guides or guide rails 34 which extend the full length of the conveyor 14 or extend only in the vicinity of the cam 26. As seen in FIG. 2, a top guide rail 34 is disposed on either side of the pan to hold it firmly. As also seen in FIG. 2, two or more index rods 24 may be used to properly align the pans 12 in rectilinear orientation with the pin-blocks 17. Alternatively, a magnarail or magnetic member may be provided across a portion or the entire feed path 15. As with the top rail 32, the magnarails 35 may be provided only in the vicinity of the cam 26. In a preferred embodiment of the invention, the pans are guided on conveyors 14 at a position approximately 1/64th of an inch from the top surface of the magnetic rails 34 so that the pans are attracted thereby, but do not contact the rails to reduce wear on the magnetic rails and on the pans.

A terminal pan conveyor 36 is provided at the end of the feed path 15 to pick up the empty pans 12 and either deposit them in a storage area or feed them to a point where pizza pan or other baked good pans are deposited therein. A baked good conveyor 37 forms a means for removing the suspended pie 11 which is carried on the pins 22 therefrom and conveying it to another area such as a freezer not shown. Conveyor 37 may take the form of a plurality of fingers which extend under the pizza or, as best shown in FIG. 2, a plurality of comb like finger conveyors which intermesh between rows of pins 22 may be used to lift the pizza or baked good 11 therefrom and convey it off the pins 22 before they descend around the pulley or sprocket 20 with their associated pin-blocks 17.

With reference made to FIG. 3, an alternate embodiment for the pin raising means is a plurality of hydraulic or pneumatic cylinders with movable pistons 40 each individually connected to a separate pin 22 for raising each pin, or a single hydraulic cylinder 41 is used for raising the pin-block 17 as a whole.

While specific embodiments of the invention have been shown and described in detail to illustrate the application of the principles of the invention, it will be understood that the invention may be embodied otherwise without departing from such principles.

What is claimed is:

1. A device for depanning freshly baked goods having a crust soon after they leave an oven and before the crust softens comprising:

a pan conveyor adapted to extend from the oven;

baking pans having a plurality of perforations therethrough disposed on said pan conveyor and moveable thereby in a feed path from the ovens, each pan adapted to carry a baked good having a crust, from the oven;

a pin-block conveyor associated with said pan conveyor;

spaced pin-blocks connected to said pin-block conveyor and moveable thereby into the vicinity of said feed path;

means for spacing said baking-pans equal to the spacing between adjacent pin-blocks;

a plurality of pins extending from each pin-block in a pattern and number corresponding to that of said perforations on said baking pan and each of a diameter at most smaller than that of each of said perforations;

a guide means associated with said pan conveyor and pin-block conveyor for guiding said baking pan on said pan conveyor to bring said perforations into alignment with said pins;

hold down means extending parallel to said pan conveyor for holding down said baking pans while allowing conveying of said baking pans and during vertical movement of said pin-blocks;

pin raising means associated with said pin-block for raising said plurality of pins at a location spaced from the oven after said perforations are brought into alignment with said pins, to extend said pins through said perforations and into contact with the crust in said pan thereby lifting the baked good in said baking pan and separating it therefrom before the crust softens; and, means associated with said pin-block for removing the baked good from said pins.

2. A device according to claim 1 wherein a feed path of said pin-block has at least a portion extending parallel with said feed path of said baking pan.

3. A device according to claim 1 wherein said hold down means comprise at least one magnetic rail disposed adjacent said feed path of said baking pan for magnetically attracting said baking pan in a direction toward said pin-block in the vicinity of said location spaced from said oven, said baking pan being made at least in part of magnetically attractable material.

4. A device according to claim 1 wherein said hold down means comprise at least one guide rail adjacent to said feed path of said baking pan for holding said baking pan toward said pin-block in the vicinity of said locations spaced from the oven.

5. A device according to claim 3 wherein said magnetic rail is positioned at a location to be spaced from said baking pan by about 1/16th of an inch in the vicinity of said locations spaced from the oven.

6. A device according to claim 1 wherein said pin raising means comprises a cam in the vicinity of said location spaced from the oven and a cam follower connected to said pin-block for abutting against said cam to move said pin-block toward said baking pan with perforations aligned with said pins.

7. A device according to claim 1 wherein said pin raising means comprises a cylinder with moveable piston connected between said pin-block and said pin-block conveyor.

8. A device according to claim 1 wherein said pin raising means comprises a cylinder and piston connected between each pin and said pin block.

9. A device according to claim 1 wherein said means for removing the baked good from said pins comprises a plurality of finger conveyors extending in the path of said pin block and between said pins.

10. A device according to claim 1 wherein said guide means comprises at least one side guide extending adjacent to said feed path of said baking pan for moving said baking pan on said baking pan conveyor.

11. A device according to claim 1 wherein said guide means comprises an indexing rod pivotally mounted in a location to extend in the path of said baking pan and the path of said pin-block, a biasing spring connected to said indexing rod for biasing said indexing rod to maintain its position in the path of said baking pan and pin-block, said pin-block moveable against the bias of said biasing spring to move said indexing rod out of the path of said baking pan, said biasing spring being of sufficient strength to stop the motion of said baking pan in its feed path on said baking pan conveyor.

* * * * *